United States Patent [19]
Jean

[11] Patent Number: 6,079,201
[45] Date of Patent: Jun. 27, 2000

[54] SELF-CLOSING PIVOTING DOOR THRUST REVERSER

[75] Inventor: Michel Christian Marie Jean, Harfleur, France

[73] Assignee: Societe Hispano—Suiza, Cedex, France

[21] Appl. No.: 08/800,517

[22] Filed: Feb. 14, 1997

[30] Foreign Application Priority Data

Feb. 15, 1996 [FR] France .................. 96. 01849

[51] Int. Cl.$^7$ ................ F02K 3/00; F02K 1/70
[52] U.S. Cl. ............ 60/226.2; 60/230; 244/110 B; 239/265.29
[58] Field of Search ............... 60/226.2, 230; 244/110 B; 239/265.25, 265.27, 265.29, 265.31

[56] References Cited

U.S. PATENT DOCUMENTS

| | | | |
|---|---|---|---|
| 3,601,992 | 8/1971 | Maison | 60/226.2 |
| 5,039,171 | 8/1991 | Lore | 60/230 |
| 5,765,362 | 6/1998 | Gonidec et al. | 60/226.2 |
| 5,872,434 | 7/1998 | Jean | 60/226.2 |

*Primary Examiner*—Ted Kim
*Attorney, Agent, or Firm*—Bacon & Thomas

[57] ABSTRACT

A self-closing pivoting door thrust reverser is disclosed in which the linkage interconnecting the thrust reverser door and the thrust reverser panel redirects the forces acting on the thrust reverser door by the thrust reverser panel so as to provide a positive, self-closing force on the thrust reverser door urging it toward, or maintaining it in, the forward thrust position. The door actuator, the thrust reverser door and the thrust reverser panel are all pivotally connected to a link member at three spaced apart pivot points. When in the forward thrust positions, the line of force acting on the thrust reverser door by the thrust reverser panel passes through, or lies radially inwardly of the pivot axis of the thrust reverser door. Thus, the force of pressurized gases acting on the inner surface of the thrust reverser panel will urge the assembly toward its forward thrust position.

6 Claims, 2 Drawing Sheets

SELF-CLOSING PIVOTING DOOR THRUST REVERSER

BACKGROUND OF THE INVENTION

The present invention relates to a thrust reverser for a turbofan-type turbojet engine in which pivotable thrust reverser doors change the direction of flow of gases passing through a cold-flow air duct to provide thrust reversing forces.

Turbofan-type turbojet engines are well-known in the art and comprise an annular housing concentrically arranged around the turbojet engine housing to define a generally annular cold flow gas duct extending along the longitudinal axis of the engine. A fan, driven by the turbojet engine, is located in the upstream portion of the cold flow gas duct to force a gas, such as air, through the duct to augment the thrust of the turbojet engine.

In such turbofan-turbojet engines having a high bypass ratio, a thrust reversing device may be associated with the annular housing to redirect at least a portion of the air passing through the cold flow gas duct to provide a thrust reversing force. It is known to provide one or more pivotable thrust reversing doors in the annular housing to redirect the cold flow gas laterally outwardly through lateral openings in the housing.

A known prior art pivoting door thrust reverser, set forth in U.S. Pat. No. 5,039,171, is illustrated in FIGS. 1 and 2. As can be seen, the thrust reverser comprises thrust reverser door 7 located on a housing having an upstream portion 1 and a downstream housing portion 3. The door 7 is pivotally attached to longitudinally extending portions of the housing interconnecting the upstream portion 1 and the downstream portion 3 so as to pivot about axis 27 between a forward thrust position, illustrated in FIG. 1, and a reverse thrust position, illustrated in FIG. 2. When in the forward thrust position, an outer surface 9 of the thrust reverser door 7 lies substantially flush with the outer surfaces of the upstream portion 1 and the downstream portion 3 of the housing so as to provide an aerodynamic outer surface to the housing. In this position, an inner surface 11 of the thrust reverser door 7 forms a portion of the outer boundary of the air duct through which the gases are directed.

This known system also incorporates a thrust reverser panel 20 that is pivotally attached to the housing so as to pivot about an axis 28 between a forward thrust position, illustrated in FIG. 1, and a reverse thrust position illustrated in FIG. 2. The thrust reverser panel 20 is connected to a thrust reverser door 7 by link 22 such that both the panel and the door move simultaneously between their forward thrust positions and their reverser thrust positions.

An actuator, in this particular instance a hydraulic cylinder having an extendible and retractable piston rod, is attached to a structure 6 forming a part of the upstream portion 1 of the housing and has the piston rod pivotally connected to inner structure 12 of the thrust reverser door 7 by pivot 10. Extension of the piston rod causes the thrust reverser door 7 and the thrust reverser panel 20 to move from their forward thrust positions to their reverse thrust positions, while retraction of the piston rod causes these elements to return to their forward thrust positions. The thrust reverser door 7 may incorporate a deflector 13, also known in the art, to impart a forward direction to the gases being redirected by the thrust reverser door when in its reverse thrust position.

This known thrust reversing system improves the forward thrust performance of the turbofan engine since the inner surfaces of the thrust reverser door 7 and the thrust reverser panel 20 form a part of the outer boundary of the duct which provides smooth, aerodynamic gas flow through the duct.

While this known system has been generally successful, in special cases it has characteristics which may be undesirable. For instance, when the aerodynamic flow lines assume certain configurations, especially regarding a shallow flow, the pressure from the gasses acting on the thrust reverser panel 20 urge it toward its open or reverse thrust position. The kinematic constraints imposed upon this design locate the pivot axis 28 towards the rear or downstream portion of the thrust reverser panel 20 such that the length $1_1$ between the pivot axis 28 and the rearmost edge of the thrust reverser panel 20 is less than length $1_2$ between the axis 28 and the front, or upstream, edge of the thrust reverser panel 20. Thus, the resultant of the forces acting on the inner surface of the thrust reverser panel 20 will generate a torque in the direction of arrow P1 on the thrust reverser panel 20, which, in turn, is transmitted to the thrust reverser door 7 via the link rod 22 in the direction of arrow F1. The direction of this force F1 will generate a torque about pivot axis 27 in the direction of arrow P3 urging the thrust reverser door 7 toward its reverse thrust position. This will occur even if the pressure from the gases in the flow duct acting on the inner surface of the thrust reverser door 7 produce self-cancelling torques in the direction of arrows P3 and P2 due to the relatively equal lengths $1_3$ and $1_4$ between the downstream edge of the inner surface of the thrust reverser door 7 and the pivot axis 27, and the distance between the upstream edge of the inner surface of the thrust reverser door 7 and the pivot axis 27, respectively.

Another drawback occurs due to the kinematic geometry of this system. As best illustrated in FIG. 2, a recess or cut-out is required in the upstream edge of the thrust reverser panel 20 to provide clearance between this edge and the actuator 8. Such a recess may be relatively large, which will degrade the structural strength of the thrust reverer panel 20 while increasing the difficulty of sealing the front edge of the panel 20 when in its forward thrust position.

SUMMARY OF THE INVENTION

A self-closing pivoting door thrust reverser is disclosed in which the linkage interconnecting the thrust reverser door and the thrust reverser panel redirects the forces acting on the thrust reverser door by the thrust reverser panel so as to provide a positive, self-closing force on the thrust reverser door urging it toward, or maintaining it in, the forward thrust position. The door actuator, the thrust reverser door and the thrust reverser panel are all pivotally connected to a link member at three spaced apart pivot points. When in the forward thrust positions, the line of force acting on the thrust reverser door by the thrust reverser panel passes through, or lies radially inwardly of the pivot axis of the thrust reverser door. Thus, the force of pressurized gases acting on the inner surface of the thrust reverser panel will urge the assembly toward its forward thrust position. The linkage also enables the thrust reverser panel and the actuator to be positioned relative to each other so as to avoid the necessity of any recesses, or cut-outs, in the upstream edge of the thrust reverser panel.

DETAILED DESCRIPTION OF THE PREFERRED EMBODIMENT

Figure 1:
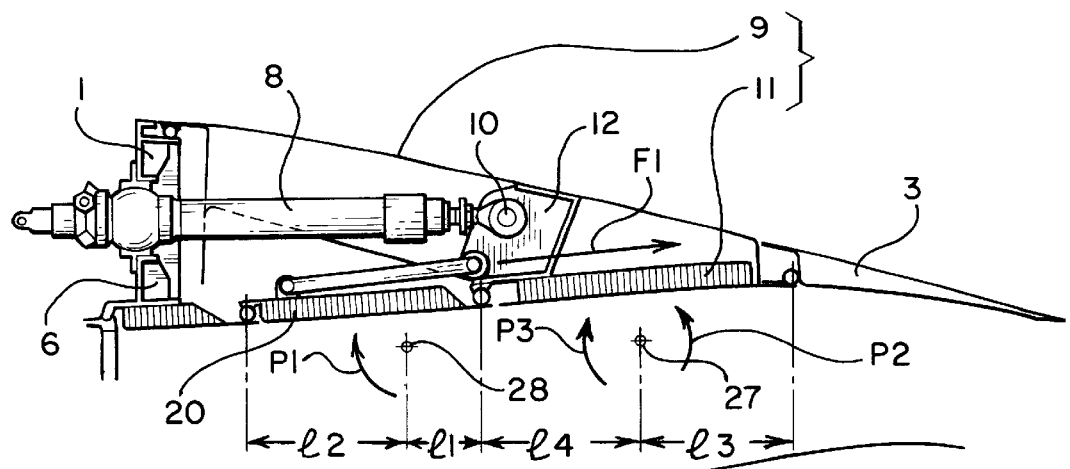
FIG. 1 is a partial, cross-sectional schematic view illustrating a known thrust reverser with the thrust reverser door and the thrust reverser panel in their forward thrust positions.
Figure 2:
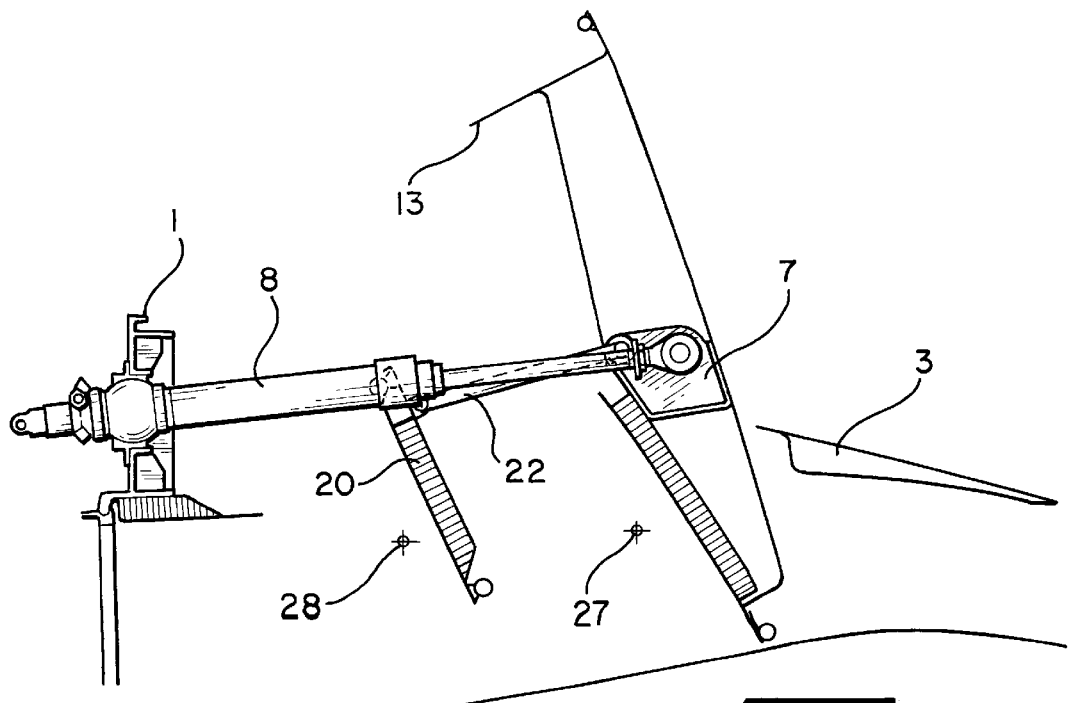
FIG. 2 is a partial, cross-sectional, schematic view of the assembly in FIG. 1 with the thrust reverser door and thrust panel in their reverse thrust positions.
Figure 3:
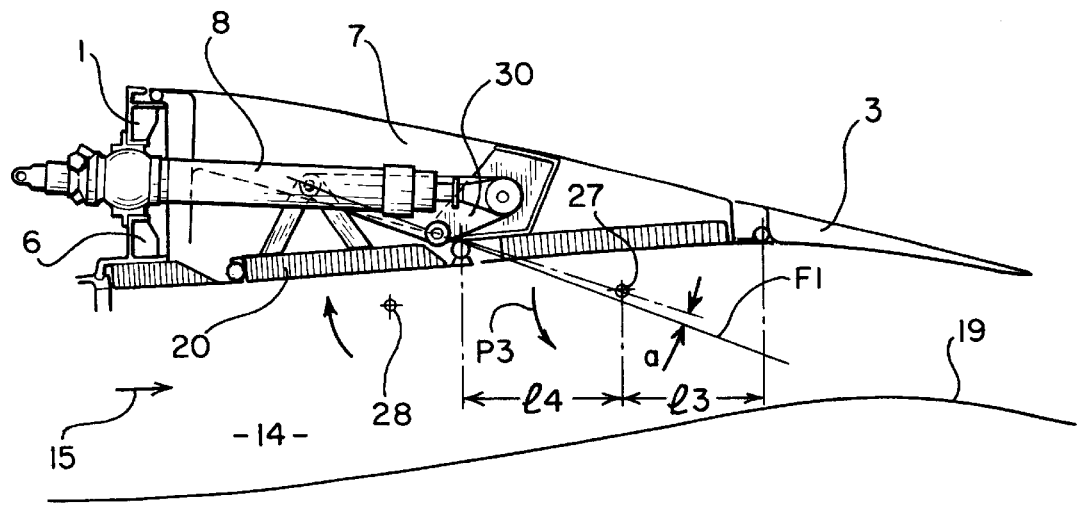
FIG. 3 is a partial, cross-sectional view of a pivoting door thrust reverser according to the present invention with the thrust reverser door and the thrust reverser panel in their forward thrust positions.
Figure 4:
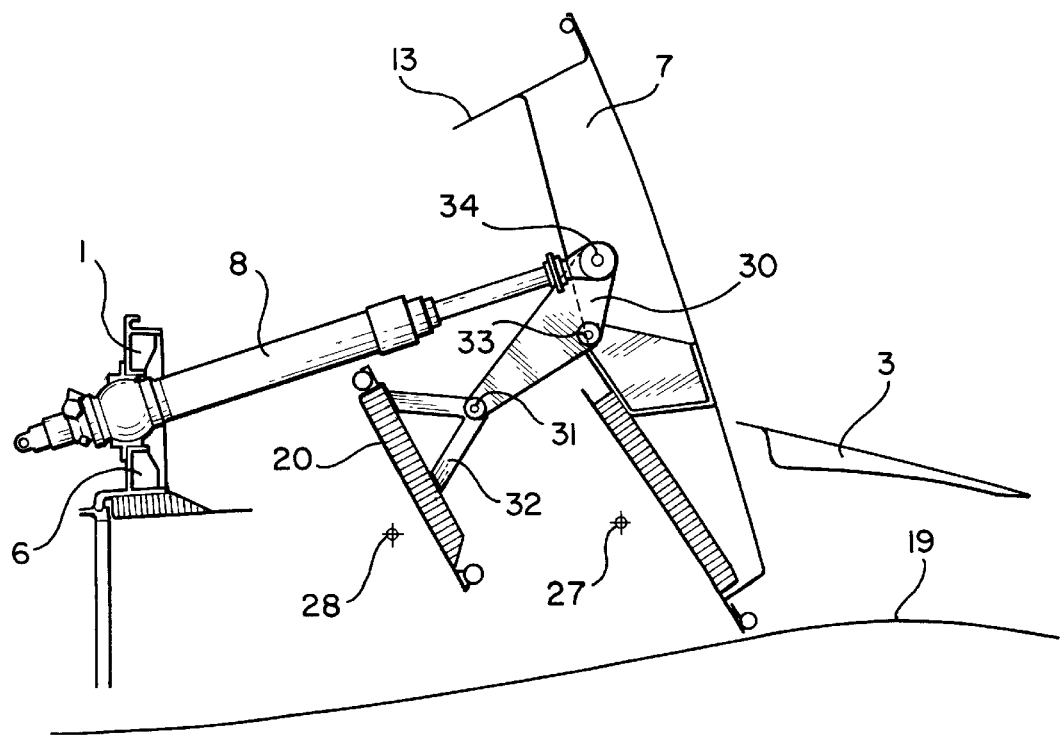
FIG. 4 is a view similar to FIG. 3 illustrating the thrust reverser door and the thrust reverser panel in their reverse thrust positions.

The self-closing pivoting door thrust reverser according to the present invention is illustrated in FIGS. 3 and 4. Those elements having the same, or equivalent functions of elements of the prior art device illustrated in FIGS. 1 and 2 have been assigned the same identifying numerals. As can be seen, the thrust reverser door 7 is pivotally attached to the housing so as to pivot about axis 27 between a forward thrust position, illustrated in FIG. 3, and a reverse thrust position, illustrated in FIG. 4. Similarly, thrust reverser panel 20 is attached to the housing so as to pivot about axis 28 between its forward thrust position, illustrated in FIG. 3, and its reverse thrust position, illustrated in FIG. 4. In their forward thrust positions, the inner surfaces of the thrust reverser door 7 and the thrust reverser panel 20 form a portion of an outer boundary of a duct 14 through which gases, such as air, pass in the direction of arrow 15. Thus, in FIGS. 3 and 4, the upstream direction is toward the left and the downstream direction is towards the right. An inner boundary of the generally annular duct 14 is formed by the turbojet engine housing 19. As is well known in the art, housing 19 encloses the turbojet engine (not shown).

In the present invention, the thrust reverser door 7 is connected to the thrust reverser panel 20 by link member 30 and support member 32. Link member 30 is generally triangular in configuration and is pivotally connected at 31 to the support member 32 which, in turn, is fixedly attached to, and extends from the thrust reverser panel 20. A second pivot 33 pivotally connects the link member 30 to the thrust reverser door 7, while a third pivot 34 pivotally connects the link member 30 to the extendible and retractable rod of actuator 8. As in the prior art, extension and retraction of the piston rod of actuator 8 moves the thrust reverser door 7 and the thrust reverser panel between their forward thrust and reverse thrust position.

As best seen in FIG. 3, when the thrust reverser door 7 and the thrust reverser panel 20 are in their forward thrust positions, the force acting on the door 7 by the thrust reverser panel 20, caused by pressurized gases acting on the inner surface of the panel 20, is exerted in the direction of arrow F1. The locations of pivots 31 and 33 are such that this direction F1 either passes through, or is located radially inwardly of the axis 27. If the force direction passes through the axis 27, the pressurized gas forces acting on the inner surface of the thrust reverser panel 20 will be neutral and will not urge the thrust reverser door 7 toward either its reverse thrust position, or its forward thrust position. In this configuration, known hydraulic locks acting on the actuator 8, and known door locks will physically lock the thrust reverser door 7 to the housing, while the hydraulic locks will prevent inadvertent extension of the piston rod of the actuator 8.

If the force direction F1 is located radially inwardly of the pivot axis 27, so as to form an angle a with a line passing through the pivot axis 27 and the pivot axis 33, such forces acting on the inner surface of the thrust reverser panel 20 will exert a positive, self-closing force on the thrust reverser door 7 urging it toward, or maintaining it in, the forward thrust position. Thus, even if the door locks and the hydraulic locks should fail, the present invention eliminates any possible danger of inadvertent movement of the thrust reverser door 7 toward its reverse thrust position.

If thrust reverser door 7 were precisely in equilibrium, wherein length $l_3$ is equal to length $l_4$, or even if the door itself should be slightly biased toward the reverse thrust position, the linkage of the present invention causes the thrust reverser door 7 to be self-closing wherein the closed, or forward thrust position, becomes the stable position. If the geometry of the thrust reverser is such that the thrust reverser door 7 is already biased toward the forward thrust position, the angle a may become zero and the arrow F1 may pass directly through the pivot axis 27.

In order to move to the reverse thrust positions, as illustrated in FIG. 4, the thrust reverser door 7 is cause to pivot about axis 27 by the extension of the rod of actuator 8. Movement of the thrust reverser door 7 is transmitted to the thrust reverser panel 20 via the link member 30 and the support member 32 such that the thrust reverser panel 20 also moves toward its reverse thrust position. The configurations of the link member 30 and the support member 32, in conjunction with the respective positions of the pivots relative to one another, preclude any interference between the upstream panel 20 and the actuator 8.

The end of the travel of the rod of the actuator 8 determines the reverse thrust positions of the door 7 and the panel 20. The actuator 8 remains pressurized to keep the thrust reverser in the desired position until a close command is received by the control system (not shown). The configurations of the link member 30 and the support member 32 also enable the thrust reverser door 7 and the thrust reverser panel 20 to be moved into their reverse thrust position by less travel of the movable portion of the actuator 8.

Since a portion of the link member 30 and the support member 32 extend into the gas flow, between the thrust reverser door 7 and the thrust reverser panel 20 during thrust reversal, these elements may have aerodynamic cross-sections to minimize aerodynamic interference with the reverse thrust gas flow.

The foregoing description is provided for illustrative purposes only and should not be construed as in any way limiting this invention, the scope of which is defined solely by the appended claims.

I claim:

1. A thrust reverser for a turbojet engine having a housing forming an outer boundary of a duct through which gases pass in an upstream to downstream direction the housing having at least one lateral opening, the thrust reverser comprising:

a) at least one thrust reverser door pivotally attached to the housing so as to be movable about a first axis between a forward thrust position, wherein the at least one thrust reverser door covers the lateral opening and wherein an inner portion of the at least one thrust reverser door forms a part of the boundary of the duct, and a reverse thrust position wherein the at least one thrust reverser door uncovers the lateral opening and directs gases flowing through the duct outwardly through the lateral opening;

b) a least one thrust reverser panel pivotally attached to the housing so as to be movable about a second axis between a forward thrust position wherein an inner surface forms a portion of the boundary of the duct, and a reverse thrust position wherein the at least one thrust reverser panel directs a portion of the gases outwardly through the lateral opening;

c) an actuator attached to the housing, the actuator having a movable portion;

d) a support member fixedly attached to and extending from the at least one thrust reverser panel; and, e) a link member having a first pivot pivotally attached to the support member, a second pivot spaced from the first pivot and pivotally attached to the at least one thrust reverser door, and a third pivot spaced from the first and second pivots pivotally attached to the movable portion of the actuator whereby forces exerted on the at least one thrust reverser door by the at least one thrust reverser panel when the at least one thrust reverser door and the at least one thrust reverser panel are in their forward thrust positions urge the at least one thrust reverser door to remain in the forward thrust position.

2. The thrust reverser door of claim 1 wherein the link member has a generally triangular configuration.

3. The thrust reverser door of claim 2 wherein the first, second and third pivots are each located at an apex of the generally triangular link member.

4. The thrust reverser of claim 1 wherein the support member has a generally "V"-shaped configuration.

5. The thrust reverser of claim 1 wherein the link member has an aerodynamic cross-sectional configuration to minimize aerodynamic disturbances in the reverse thrust gas flow.

6. The thrust reverser of claim 1 wherein the support member has an aerodynamic cross-sectional configuration to minimize aerodynamic disturbances in the reverse thrust gas flow.

* * * * *